United States Patent
Imamura et al.

(10) Patent No.: US 8,351,385 B2
(45) Date of Patent: Jan. 8, 2013

(54) RADIO COMMUNICATION BASE STATION DEVICE, RADIO COMMUNICATION TERMINAL DEVICE, AND RESPONSE SIGNAL ALLOCATION METHOD

(75) Inventors: Daichi Imamura, Kanagawa (JP); Akihiko Nishio, Kanagawa (JP); Seigo Nakao, Kanagawa (JP); Sadaki Futagi, Ishikawa (JP); Tomofumi Takata, Ishikawa (JP)

(73) Assignee: Panasonic Corporation, Osaka (JP)

( * ) Notice: Subject to any disclaimer, the term of this patent is extended or adjusted under 35 U.S.C. 154(b) by 400 days.

(21) Appl. No.: 12/679,268

(22) PCT Filed: Sep. 19, 2008

(86) PCT No.: PCT/JP2008/002594
§ 371 (c)(1),
(2), (4) Date: Mar. 19, 2010

(87) PCT Pub. No.: WO2009/037853
PCT Pub. Date: Mar. 26, 2009

(65) Prior Publication Data
US 2010/0232378 A1    Sep. 16, 2010

(30) Foreign Application Priority Data

Sep. 21, 2007 (JP) .................................. 2007-245929

(51) Int. Cl.
*H04W 4/00* (2009.01)
(52) U.S. Cl. ..................................... 370/329; 455/452.1
(58) Field of Classification Search .......................... None
See application file for complete search history.

(56) References Cited

U.S. PATENT DOCUMENTS

2009/0074090 A1* 3/2009 Xu et al. ........................ 375/260
2010/0041430 A1  2/2010 Ishii

FOREIGN PATENT DOCUMENTS

| EP | 2 129 139 | 12/2009 |
| WO | 2008/105310 | 9/2008 |
| WO | 2008/105316 | 9/2008 |

OTHER PUBLICATIONS

International Search Report dated Dec. 22, 2008.
3GPP TSG-RAN WG1 Meeting #50, R1-073607, "Panasonic, PDCCH Signaling for retransmission of downlink persistent scheduling," Aug. 24, 2008, pp. 1-3.
3GPP TSG-RAN WG1 Meeting #49, R1-072088, Panasonic, "Mapping of PDCCH, ACK/NACK and Cat0," May 11, 2007, pp. 1-4.
3GPP TSG-RAN WG1 Meeting #50, R1-073621, Panasonic, "Variable Phase Definition of the Reference Signal for CQI in PUCCH," Aug. 24, 2007, pp. 1-5.

(Continued)

*Primary Examiner* — Jianye Wu
(74) *Attorney, Agent, or Firm* — Dickinson Wright PLLC

(57) ABSTRACT

It is possible to provide a radio communication base station device, a radio communication terminal device, and a response signal allocation method which perform D-ACK and P-ACK resource allocation while maintaining a high use efficiency of the upstream line control channel of PUCCH or the like. When a plurality of CCE are allocated upon PDCCH transmission, PUCCH resources corresponding to odd CCE numbers are allocated for D-ACK and PUCCH resources corresponding to even CCE numbers are allocated for P-ACK among a plurality of CCE numbers which can be used.

4 Claims, 10 Drawing Sheets

OTHER PUBLICATIONS

3GPP TSG-RAN WG1 Meeting #51, R1-074787,Samsung, NTT DoCoMo, Panasonic, Qualcomm, "UL ACK/NACK resource indication for DL persistent scheduling," Nov. 9, 2007, pp. 1-3.

3GPP TSG-RAN WG1 Meeting #48bis, R1-072315, Nokia Siemens Networks, Nokia, "Multiplexing capability of CQIs and ACK/NACKs form different UEs," May 11, 2007, pp. 1-4.+, p. 6, line 15.

3GPP TSG-RAN WG1 Meeting #49, R1-072348, LG Electronics, "Allocation of UL ACK/NACK index," May 11, 2007, pp. 1-4, p. 6, line 19.

3GPP TSG-RAN WG1 Meeting #49, R1-072439, NTT DoCoMo, Fujitsu, Mitsubishi Electric, "Implicit Resource Allocation of ACK/NACK Signal in E-UTRA Uplink," May 11, 2007, pp. 1-3, p. 6, line 22.

3GPP TSG-RAN WG1 Meeting #49bis, R1-073122, Samsung, "Implicit mapping of CCE to UL ACK/NACK resource," Jun. 29, 2007, pp. 1-4, p. 6, line 26.

* cited by examiner

CYCLIC SHIFT SPREADING

| | 1 | 2 | 3 | 4 | 5 | 6 |
|---|---|---|---|---|---|---|
| 1 | CCE#0 | CCE#3 | | | | |
| 2 | CCE#1 | CCE#4 | | | | CCE#16 |
| 3 | CCE#2 | CCE#5 | | | | CCE#17 |

BLOCK SPREADING (WALSH COVERING)

FIG.9A

CYCLIC SHIFT SPREADING

| | 1 | 2 | 3 | 4 | 5 | 6 |
|---|---|---|---|---|---|---|
| 1 | D-ACK | CCE#3 | D-ACK | P-ACK | P-ACK | |
| 2 | CCE#1 | D-ACK | CCE#7 | P-ACK | P-ACK | CQI |
| 3 | D-ACK | CCE#5 | D-ACK | P-ACK | P-ACK | |

BLOCK SPREADING (WALSH COVERING)

FIG.9B

CYCLIC SHIFT SPREADING

| | 1 | 2 | 3 | 4 | 5 | 6 |
|---|---|---|---|---|---|---|
| 1 | D-ACK | P-ACK | D-ACK | P-ACK | CCE#12 | |
| 2 | P-ACK | D-ACK | P-ACK | D-ACK | P-ACK | CQI |
| 3 | D-ACK | P-ACK | D-ACK | P-ACK | CCE#14 | |

BLOCK SPREADING (WALSH COVERING)

FIG.9C

CYCLIC SHIFT SPREADING

|   | 1 | 2 | 3 | 4 | 5 | 6 |
|---|---|---|---|---|---|---|
| 1 | CCE#0 | CCE#1 | CCE#2 | CCE#3 | | |
| 2 | CCE#6 | CCE#7 | | | | |
| 3 | | | | | CCE#16 | CCE#17 |

FIG.10A

CYCLIC SHIFT SPREADING

|   | 1 | 2 | 3 | 4 | 5 | 6 |
|---|---|---|---|---|---|---|
| 1 | D-ACK | CCE#1 | D-ACK | P-ACK | P-ACK | |
| 2 | D-ACK | CCE#7 | CCE#8 | P-ACK | P-ACK | CQI |
| 3 | D-ACK | CCE313 | CCE#14 | P-ACK | P-ACK | |

FIG.10B

CYCLIC SHIFT SPREADING

|   | 1 | 2 | 3 | 4 | 5 | 6 |
|---|---|---|---|---|---|---|
| 1 | D-ACK | P-ACK | D-ACK | P-ACK | D-ACK | |
| 2 | D-ACK | P-ACK | D-ACK | P-ACK | D-ACK | CQI |
| 3 | D-ACK | P-ACK | CCE#14 | P-ACK | CCE#17 | |

FIG.10C

RADIO COMMUNICATION BASE STATION DEVICE, RADIO COMMUNICATION TERMINAL DEVICE, AND RESPONSE SIGNAL ALLOCATION METHOD

TECHNICAL FIELD

The present invention relates to a radio communication base station apparatus, a radio communication terminal apparatus and a response signal allocation method.

BACKGROUND ART

In mobile communications, automatic repeat request ("ARQ") is applied to downlink data from a radio communication base station apparatus (hereinafter "base station") to radio communication mobile station apparatuses (hereinafter "mobile stations"). With ARQ, mobile stations feed back response signals representing error detection results of downlink data, to a base station. To be more specific, the mobile stations perform CRC (Cyclic Redundancy Check) check for uplink data, and, if CRC=OK (no error), feed back an ACK (ACKnowledgment), and, if CRC=NG (error present), feed back a NACK (Negative ACKnowledgment), as a response signal to the base station. These response signals are transmitted to the base station using an uplink control channel, for example, a PUCCH (Physical Uplink Control Channel) and an uplink L1/L2 CCH (L1/L2 Control Channel).

Further, as shown in FIG. 1, studies are underway to code-multiplex response signals transmitted from a plurality of mobile stations by spreading response signals using CAZAC (Constant Amplitude Zero Auto Correlation) sequences and Walsh sequences (see Non-Patent Document 1). In FIG. 1, [$W_0$, $W_1$, $W_2$, $W_3$] represent a Walsh sequence of a sequence length of 4. As shown in FIG. 1, in a mobile station, an ACK or NACK response signal is subject to first spreading to one SC-FDMA (Single Carrier-Frequency Division Multiple Access) symbol by a CAZAC sequence (with a sequence length of 12) in the frequency domain first.

Next, the mobile station associates the response signal after the first spreading with $W_0$ to $W_3$ and performs an IFFT (Inverse Fast Fourier Transform). By this IFFT, the response signal spread by the CAZAC sequence of a sequence length of 12 in the frequency domain is converted to a CAZAC sequence of a sequence length of 12 in the time domain. Then, the signal after the IFFT is secondly spread using a Walsh sequence (with a sequence length of 4). That is, one response signal is assigned to each of four SC-FDMA symbols $S_0$ to $S_3$. Likewise, other mobile stations spread response signals using a CAZAC sequence and a Walsh sequence. Different mobile stations use CAZAC sequences of different amounts of cyclic shift in the time domain or use different Walsh sequences.

Here, the sequence length of a CAZAC sequence in the time domain is 12, so that it is possible to use twelve CAZAC sequences of amounts of cyclic shift "0" to "11" generated from the same CAZAC sequence. Also, the sequence length of a Walsh sequence is 4, so that it is possible to use four different Walsh sequences. Consequently, in an ideal communication environment, it is possible to code-multiplex response signals from maximum forty-eight (12×4) mobile stations.

Meanwhile, in mobile stations, CAZAC sequences of different amounts of cyclic shift between mobile stations are used as ACK/NACK reference signals (hereinafter "RSs (reference signals)"), RSs are subject to second spreading using a spreading code ($F_0$, $F_1$, $F_2$) of sequence length of 3. Consequently, in an ideal communication environment, it is possible to code-multiplex maximum thirty-six (12×3) response signals from the mobile stations.

Here, the cross-correlation between CAZAC sequences between varying amounts of cyclic shift generated from the same CAZAC sequence, is zero. Consequently, in an ideal communication environment, correlation processing in the base station makes it possible to separate a plurality of response signals spread by CAZAC sequences of varying amounts of cyclic shift (the amounts of cyclic shift 0 to 11) and code-multiplexed, without inter-code interference in the time domain.

However, a plurality of response signals transmitted from a plurality of mobile stations do not all arrive at the base station at the same time due to the difference of transmission timings between mobile stations, the influence of multipath delayed waves, frequency offset, and so on. For example, when the transmission timing of a response signal spread by the CAZAC sequence of the amount of cyclic shift "0" is delayed from the correct transmission timing, the correlation peak of the CAZAC sequence of the amount of cyclic shift "0" may appear in the detection window for the CAZAC sequence of the amount of cyclic shift "1." Further, when there is a delayed wave in a response signal spread by a CAZAC sequence of the amount of cyclic shift "0," an interference leakage due to that delayed wave may appear in the detection window for the CAZAC sequence of the amount of cyclic shift "1." In these cases, the CAZAC sequence of the amount of cyclic shift "1" is interfered with the CAZAC sequence of the amount of cyclic shift "0." Consequently, in these cases, the performance of separation between the response signal spread by the CAZAC sequence of the amount of cyclic shift "0" and the response signal spread by the CAZAC sequence of the amount of cyclic shift "1" degrades. Therefore, if CAZAC sequences of adjacent amounts of cyclic shift are used, the performance for separating response signals may degrade.

Therefore, when a plurality of response signals are code-multiplexed by spreading of CAZAC sequences, a cyclic shift interval is provided between CAZAC sequences to reduce inter-code interference between CAZAC sequences. For example, studies are underway to use, when the cyclic shift interval between CAZAC sequences is 2, only six CAZAC sequences of amounts of cyclic shift "0," "2," "4" "6" "8" and "10" or "1," "3" "5," "7," "9" and "11" for the first spreading of a response signal among twelve CAZAC sequences of the amounts of cyclic shift "0" to "12." Therefore, if a Walsh sequence of a sequence length of 4 is used for second spreading of a response signal, it is possible to code-multiplex response signals from maximum twenty-four (6×4) mobile stations.

Further, a base station transmits control information for reporting a resource allocation result of downlink data to mobile stations. This control information is transmitted to mobile stations using mobile station-specific downlink control channels including PDCCHs (Physical Downlink Control Channels), downlink L1/L2 CCHs (L1/L2 Control Channels), DL Grant (Downlink scheduling Grant), and so on. Each PDCCH occupies one or a plurality of CCEs (Control Channel Elements). When one PDCCH occupies a plurality of CCEs, one PDCCH occupies a plurality of consecutive CCEs. According to the number of CCEs required to report control information, the base station allocates either PDCCH in a plurality of PDCCHs to each mobile station, and maps control information to physical resources corresponding to the CCEs occupied by PDCCHs, to transmit the control information.

ACK and NACK response signals are classified into the following two kinds. One is ACK/NACK response signals in response to data transmission that uses resources allocated dynamically by a scheduler based on channel quality, and the other is ACK/NACK response signals in response to data transmission that is used toward services such as VoIP (Voice over IP) and streaming and that uses resources to equal resources allocated in advance a plurality of times. Now, the former response signals in response to data transmission using resources dynamically allocated (i.e. data transmission subject to dynamic scheduling) are referred to as "D-ACKs," and the latter response signals in response to data transmission that uses resources to equal resources allocated in advance a plurality of times (i.e. data transmission subject to persistent scheduling) are referred to as "P-ACKs."

When a mobile station transmits an ACK/NACK response signal, the mobile station needs to know the ACK/NACK resources (frequency bands, cyclic shift CAZAC sequences and orthogonal sequences). The following methods are studied as this resource reporting method.

To eliminate the need for signaling for reporting the PUCCHs to use to transmit D-ACKs from the base station to mobile stations, and to use downlink resources efficiently, studies are underway to associate CCEs with PUCCHs on a one-by-one basis. According to this association, each mobile station is able to identify the PUCCH to use to transmit a response signal from the mobile station, from CCEs corresponding to physical resources to which control information for the mobile station is mapped. Consequently, each mobile station maps a response signal from the mobile station, to the physical resources of the PUCCH based on the CCE corresponding to the physical resources to which control information for the mobile station is mapped.

Here, the number of CCEs occupied by a PDCCH varies depending on the modulation scheme and coding rate (MCS: Modulation and Coding Scheme) of the PDCCH. When a mobile station is located distant from the base station and the received quality at the mobile station is poor, the base station lowers the MCS level of the PDCCH (i.e. lowers the M-ary modulation number or the coding rate) while increasing the number of CCEs. Further, when a mobile station is located near the base station and the received quality at the mobile station is high, the base station raises the MCS level of the PDCCH (i.e. raises the M-ary modulation number or the coding rate) while decreasing the number of CCEs. That is, a PDCCH of a low MCS level occupies a large number of CCEs and a PDCCH of a high MCS level occupies a small number of CCEs. In other words, the number of CCEs for a mobile station to which a PDCCH of a low MCS level is allocated, is great, and the number of CCEs for a mobile station to which a PDCCH of a high MCS level is allocated, is small. If a coding rate of the PDCCH is either ⅔, ⅓ or ⅙ and the PDCCH of coding rate ⅔ occupies one CCE, the PDCCH of a coding rate ⅓ occupies two CCEs, the PDCCH of a coding rate ⅙ occupies four CCEs.

Then, studies are underway to transmit, when a plurality of CCEs are allocated to one mobile station in this way, from a mobile station an ACK/NACK response signal using only a PUCCH associated with the CCE of the smallest number among a plurality of CCEs (see Non-Patent Document 2).

As for the signaling from a base station to mobile stations for reporting PUCCHs to use to transmit P-ACKs, according to Non-Patent Document 3, the transmission parameters upon initial data transmission in persistent scheduling are reported in advance, and therefore a PDCCH is not accompanied upon data transmission and reception. Accordingly, P-ACK resources are allocated and reported in advance before data transmission and reception. Therefore, Non-Patent Document 3 discloses securing P-ACK resources apart from D-ACK resources.

According to the method of P-ACK resources disclosed in Non-Patent Document 4, when the number of CCEs to use PDCCH transmission is small, CCEs of great number are not used for PDCCH transmission, and therefore ACK/NACK resources applicable to these great number CCEs are allocated as resources for other data. The method disclosed in Non-Patent Document 4 is applicable to reservation of P-ACK resources, CCE numbers to which a PDCCH is less likely to be allocated are secured as P-ACK resources (see FIG. 2).

Non-Patent Document 1: R1-072315, Nokia Siemens Networks, Nokia, "Multiplexing capability of CQIs and ACK/NACKs form different UEs," 3GPP TSG-RAN WG1 Meeting #48bis, St. Julians, Malta, Mar. 26-30, 2007

Non-Patent Document 2: R1-072348, LG Electronics, "Allocation of UL ACK/NACK index", 3GPP TSG-RAN WG1 Meeting #49, Kobe, Japan, May 7-11, 2007

Non-Patent Document 3: R1-072439, NTT DoCoMo, Fujitsu, Mitsubishi Electric, "Implicit Resource Allocation of ACK/NACK Signal in E-UTRA Uplink," 3GPP TSG RAN WG1 Meeting #49, Kobe, Japan, May 7-11, 2007

Non-Patent Document 4: R1-073122, Samsung, "Implicit mapping of CCE to UL ACK/NACK resource," 3GPP TSG-RAN WG1 Meeting #49bis, Orlando, USA, Jun. 25-39, 2007

DISCLOSURE OF INVENTION

Problems to be Solved by the Invention

However, when a plurality of CCEs are allocated for PDCCH transmission, as shown in FIG. 3, ACK/NACK resources that cannot be used (a cyclic shift sequence, a Walsh sequence and so on) are produced. Therefore, when the number of PDCCHs to which a plurality of CCEs are allocated increases, the number of ACK/NACKs that can be transmitted at the same time is limited. If the number of ACK/NACKs that can be transmitted is limited, the number of PDCCHs is limited and the number of PDSCHs to form pairs with PDCCHs is limited.

It is therefore an object of the present invention to provide a radio communication base station apparatus, a radio communication terminal apparatus and response signal allocation method for allocating D-ACK resources and P-ACK resources while maintaining the number of uplink control channels including PUCCHs (i.e. the number of ACK/NACK resources) that can be transmitted at the same time.

Means for Solving the Problem

The radio communication base station apparatus of the present invention provides a radio communication base station apparatus in which, in downlink data transmitted to a radio communication terminal apparatus subject to dynamic scheduling that performs scheduling dynamically, resources to use to transmit an acknowledgment or negative acknowledgment in uplink from the radio communication mobile station apparatus, are associated on a one-by-one basis with control channel element numbers allocated to a physical downlink control channel for downlink data transmission, and adopts the configuration including: a resource control section that, when a plurality of control channel elements are allocated to one physical downlink control channel, allocates resources corresponding to one of odd control channel element numbers and even control channel element numbers for an acknowledgment or negative acknowledgment transmitted from a radio communication terminal apparatus, and allocates resources corresponding to the other control channel element numbers for an acknowledgment or negative acknowledgment transmitted from a radio communication terminal apparatus subject to persistent scheduling; and a reporting section that reports the allocated resources to a radio communication terminal apparatus to which resources are allocated.

The radio communication terminal apparatus of the present invention provides a radio communication terminal apparatus in which, in uplink data subject to dynamic scheduling performing scheduling dynamically and transmitted, resources to use to transmit an acknowledgment or negative acknowledgment in downlink from a mobile communication base station apparatus are associated on a one-by-one basis with control channel element numbers allocated to a physical downlink control channel including physical uplink shared channel scheduling information, and adopts the configuration including: a resource control section that, when a plurality of control channel elements are allocated to one physical downlink control channel, allocates resources corresponding to one of odd control channel element numbers and even control channel element numbers for an acknowledgment or negative acknowledgment in a case where the resources are subject to dynamic scheduling, and allocates resources corresponding to the other control channel element numbers for an acknowledgment or negative acknowledgment in the case where the resources are subject to persistent scheduling; and a reporting section that reports the allocated resources to a radio communication base station apparatus to which resources are allocated.

The response signal allocation method of the present invention includes the steps of: in downlink data transmitted to a radio communication terminal apparatus subject to dynamic scheduling that performs scheduling dynamically, associating on a one-by-one basis resources to use to transmit an acknowledgment or negative acknowledgment in uplink from the radio communication mobile station apparatus with control channel element numbers allocated to a physical downlink control channel for downlink data transmission; and, when a plurality of control channel elements are allocated to one physical downlink control channel, allocating resources corresponding to one of odd control channel element numbers and even control channel element numbers for an acknowledgment or negative acknowledgment transmitted from a radio communication terminal apparatus and allocating resources corresponding to the other control channel element numbers for an acknowledgment or negative acknowledgment transmitted a radio communication terminal apparatus subject to persistent scheduling.

Advantageous Effects of Invention

According to the present invention, it is possible to allocate D-ACK resources and P-ACK resources while maintaining the use of uplink control channels including PUCCHs efficient.

BRIEF DESCRIPTION OF DRAWINGS

FIG. 9 shows a comparison of PUCCH resource allocation and the allocation situation between the method disclosed in Non-Patent Document 4 and the present embodiment in mapping pattern A; and FIG. 10 shows a comparison of PUCCH resource allocation and the allocation situation between the method disclosed in Non-Patent Document 4 and the present embodiment in mapping pattern B.

BEST MODE FOR CARRYING OUT THE INVENTION

Now, an embodiment of the present invention will be described in detail with reference to the accompanying drawings.

Here, all uplink control channels which a base station allocates to mobile stations may be collectively referred to as "PUCCH." However, for ease of explanation, mobile station-specific uplink control channels are referred to as "PUCCHs." The former PUCCH does not technically differ from the latter PUCCH, so that the present invention is applicable to either PUCCH.

Likewise, all downlink control channels which a base station allocates to mobile stations may be collectively referred to as "PDCCH." However, for ease of explanation, mobile station-specific downlink control channels are referred to as "PDCCHs." The former PDCCH does not technically differ from the latter PDCCH, so that the present invention is applicable to either PDCCH.

Figure 4:
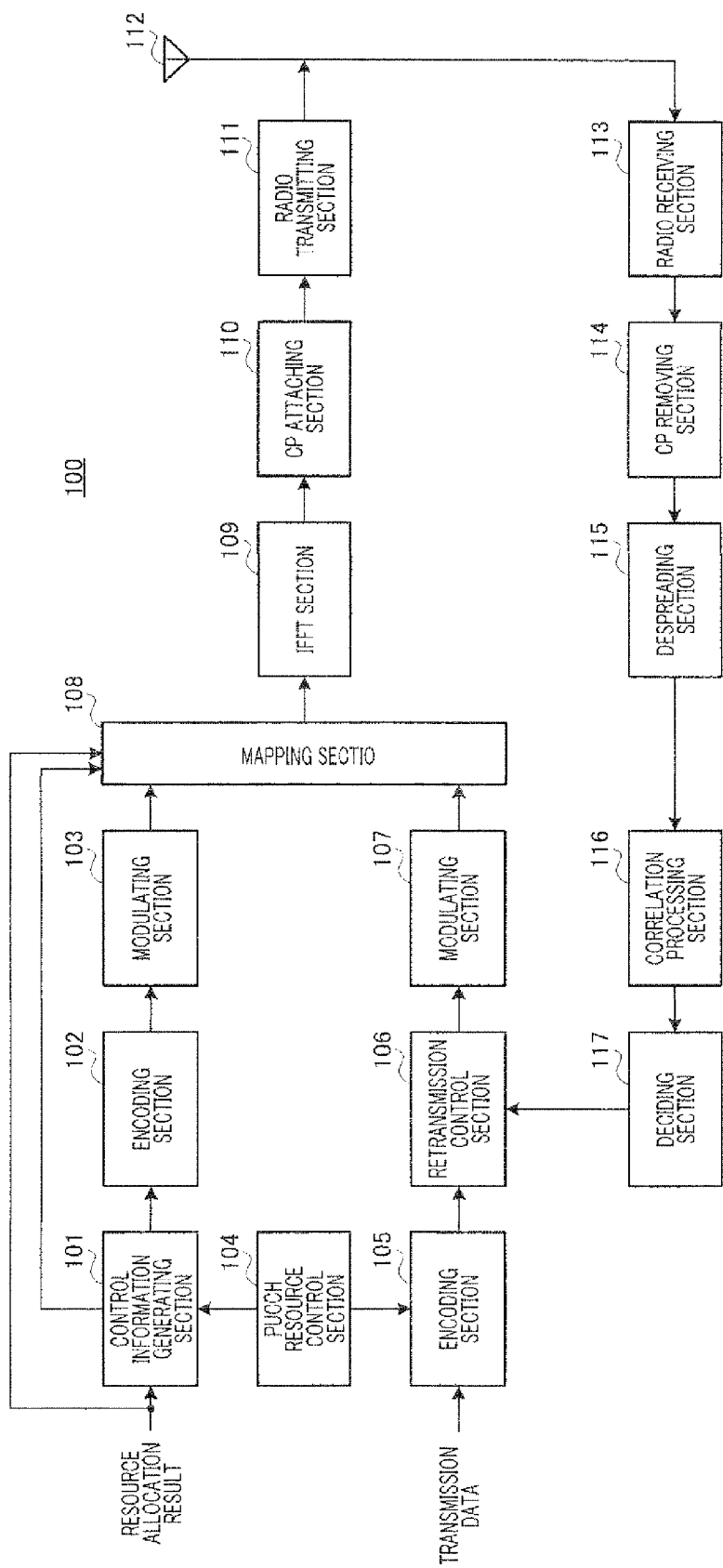
FIG. 4 is a block diagram showing a configuration of the base station according to the embodiment of the present invention.
Figure 5:
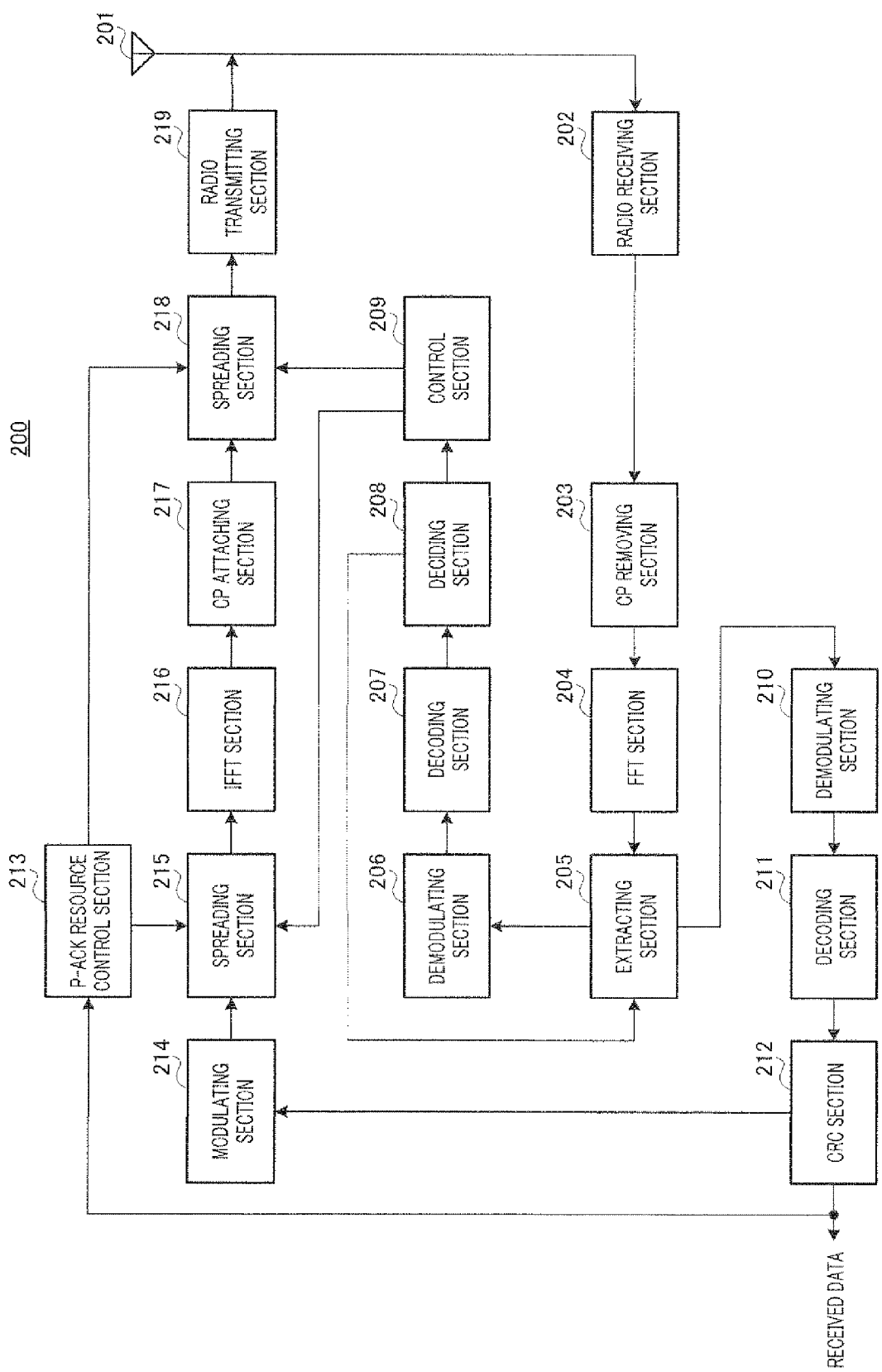
FIG. 5 is a block diagram showing a configuration of the mobile station according to the embodiment of the present invention.

Now, FIG. 4 shows a configuration of base station 100, and FIG. 5 shows a configuration of mobile station 200 according to the embodiment of the present invention.

To avoid complicated explanation, FIG. 4 shows components associated with transmission of downlink data and components associated with reception of uplink response signals to the downlink data, which are closely related to the present invention, and drawings and explanations of the components associated with reception of uplink data will be omitted. Likewise, FIG. 5 shows components associated with reception of downlink data and components associated with transmission of uplink response signals to the downlink data, which are closely related to the present invention, and illustration and explanation of the components associated with transmission of uplink data will be omitted.

In base station 100 shown in FIG. 4, control information generating section 101 and mapping section 108 receive as input a downlink data resource allocation result.

Control information generating section 101 generates control information for reporting the resource allocation result, on a per mobile station basis, and outputs the generated control information to encoding section 102. Control information per mobile station includes mobile station ID information to designate to which mobile station the control information is directed. For example, control information includes, as mobile station ID information, CRC bits masked by the ID numbers of mobile stations, to which control information is reported. The control information per mobile station is encoded in encoding section 102, modulated in modulating section 103 and is received as input to mapping section 108. Further, based on D-ACK allocation CCE number information received as input from PUCCH resource control section 104, control information generating section 101 allocates PDCCHs per PDCCH of a mobile station, according to the number of CCEs (the number of occupied CCEs) required to report control information, and outputs the CCE numbers corresponding to the allocated PDCCHs to mapping section 108. Encoding section 102 and modulating section 103 changes the coding rate and the M-ary modulation number of the control information according to the number of CCEs occupied by one PDCCH.

PUCCH resource control section 104 controls and allocates varying PUCCH transmission resources every different type of control information such as a D-ACK and a P-ACK. Here, PUCCH resource control section 104 first determines the CCE numbers that can be used to transmit D-ACKs from the mobile stations, and outputs information about the determined D-ACK allocation CCE numbers to control information generating section 101. Further, PUCCH resource control section 104 generates P-ACK resource information allocated in advance to the mobile stations subject to resource allocation by persistent scheduling as upper-layer control information, and transmits the generated information as transmission data. The P-ACK resource information outputted to encoding section 105 is reported as downlink transmission data to the allocated mobile stations. The operations of PUCCH resource control section 104 will be described later.

Meanwhile, encoding section 105 encodes transmission data for the mobile stations (downlink data) and the P-ACK resource information outputted from PUCCH resource control section 104, and outputs the encoded transmission data and P-ACK resource information to retransmission control section 106.

Upon initial transmission, retransmission control section 106 holds encoded transmission data on a per mobile station basis, and outputs the data to modulating section 107. Retransmission control section 106 holds the transmission data until retransmission control section 106 receives as input an ACK from each mobile station from deciding section 117. Further, upon receiving as input a NACK from each mobile station from deciding section 117, that is, upon retransmission, retransmission control section 106 outputs transmission data in response to that NACK to modulating section 107.

Modulating section 107 modulates the encoded transmission data received as input from retransmission control section 106, and outputs the modulated transmission data to mapping section 108.

Upon transmission of control information, mapping section 108 maps the control information received as input from modulating section 103 to physical resources based on the CCE numbers received as input from control information generating section 101, and outputs the mapped control information to IFFT section 109. That is, mapping section 108 maps the mobile station-specific control information to the subcarriers corresponding to the CCE numbers in a plurality of subcarriers forming an OFDM symbol.

Meanwhile, upon transmission of downlink data, mapping section 108 maps the transmission data for the mobile stations to physical resources based on the resource allocation result, and outputs the mapped transmission data to IFFT section 109. That is, based on the resource allocation result, mapping section 108 maps mobile station-specific transmission data to subcarriers in a plurality of subcarriers forming an OFDM symbol.

IFFT section 109 generates an OFDM symbol by performing an IFFT for a plurality of subcarriers to which the control information or the transmission data is mapped, and outputs the generated OFDM symbol to CP (Cyclic Prefix) attaching section 110.

CP attaching section 110 attaches the same signal as the signal at the tail end part of the OFDM symbol, to the head of that OFDM symbol as a CP.

Radio transmitting section 111 performs transmission processing such as D/A conversion, amplification and up-conversion on the OFDM symbol with a CP, and transmits the OFDM symbol after transmission processing from antenna 112 to mobile station 200 (in FIG. 5).

Radio receiving section 113 receives an ACK/NACK response signal transmitted from mobile station 200, via antenna 112, and performs receiving processing such as down-conversion and A/D conversion on the ACK/NACK response signal.

CP removing section 114 removes the CP attached to the ACK/NACK response signal after receiving processing.

Despreading section 115 despreads the ACK/NACK response signal by Walsh sequences that are used for second spreading in mobile station 200, and outputs the despread ACK/NACK response signal to correlation processing section 116.

Correlation processing section 116 finds the correlation value between the ACK/NACK response signal received as input from despreading section 115, that is, the ACK/NACK response signal despread by a CAZAC sequence, and the CAZAC sequence used for the first spreading in mobile station 200, and outputs the correlation value to deciding section 117.

Deciding section 117 performs threshold decision on the correlation values on a per mobile station basis, using a detection window set per mobile station in the time domain, thereby detecting mobile station-specific ACK/NACK response signals.

For example, when the correlation value exceeds a predetermined threshold in detection window #1 for mobile station #1, deciding section 117 detects an ACK/NACK response signal from mobile station #1. Then, deciding section 117 decides whether the detected ACK/NACK response signal is an ACK or NACK, and outputs the ACK or NACK for each mobile station to retransmission control section 106.

On the other hand, in mobile station 200 shown in FIG. 5, radio receiving section 202 receives the OFDM symbol transmitted from base station 100, via antenna 201, and performs receiving processing such as down-conversion and A/D conversion on the OFDM symbol.

CP removing section 203 removes the CP attached to the OFDM symbol subjected to receiving processing.

FFT (Fast Fourier Transform) section 204 acquires control information or downlink data mapped on a plurality of subcarriers by performing a FFT of the OFDM symbol, and outputs the control information or downlink data to extracting section 205.

Upon receiving the control information, extracting section 205 extracts the control information from a plurality of subcarriers and outputs it to demodulating section 206. This control information is demodulated in demodulating section 206, decoded in decoding section 207 and is received as input to deciding section 208.

When deciding section 208, which decides whether or not the control information received as input from decoding section 207 is control information directed to the mobile station, decides that control information in which CRC=OK is found (no error) is directed to the mobile station, deciding section 208 outputs the control information directed to the mobile station, that is, outputs the resource allocation result of downlink data for the mobile station, to extracting section 205. Further, deciding section 208 decides CCE numbers associated with subcarriers to which the control information directed to the mobile station (PDCCH) is mapped, and outputs the decision result (i.e. CCE numbers) to control section 209.

Based on the CCE numbers received as input from deciding section 208, control section 209 decides PUCCH resources (D-ACK resources) that can be used to transmit a response signal from the mobile station, and, based on the decision result (PUCCH numbers), to control the amount of cyclic shift of the ZC sequence to use the first spreading in spreading section 215 and the Walsh sequence that is used for a second spreading in spreading section 218. That is, control section 209 sets a ZC sequence of the amount of cyclic shift selected based on the decision result (i.e. PUCCH numbers) in spreading section 215 and sets a Walsh sequence selected based on the decision result (i.e. PUCCH numbers) in spreading section 218.

Meanwhile, upon receiving downlink data, extracting section 205 extracts the downlink data directed to the mobile station from a plurality of subcarriers, based on the resource allocation result received as input from deciding section 208, and outputs the extracted downlink data to demodulating section 210. This downlink data is demodulated in demodulating section 210, decoded in decoding section 211 and received as input in CRC section 212.

CRC section 212 performs an error detection of the decoded downlink data using a CRC, generates an ACK in the case of CRC=OK (no error) and a NACK in the case of CRC=NG (error present), as a response signal. CRC section 212 outputs the generated response signal to modulating section 214. Further, in the case of CRC=OK (no error), CRC section 212 outputs the decoded downlink data as received data. Further, CRC section 212 outputs the P-ACK resource information included in the received upper layer control information to P-ACK resource control section 213.

Based on the P-ACK resource information received as input from CRC section 212, P-ACK resource control section 213 controls the amount of cyclic shift of the CAZAC sequence to use the first spreading in spreading section 215 and the Walsh sequence to use the second spreading in spreading section 218. That P-ACK resource control section 213 sets in spreading section 215 a CAZAC sequence of the amount of cyclic shift selected based on information commanded from the base station with the P-ACK resource information received as input from CRC section 212, and sets in spreading section 218 a Walsh sequence selected based on information commanded from the base station with P-ACK resource information.

Modulating section 214 modulates the response signal received as input from CRC section 212 and outputs the modulated response signal to spreading section 215.

Figure 1:
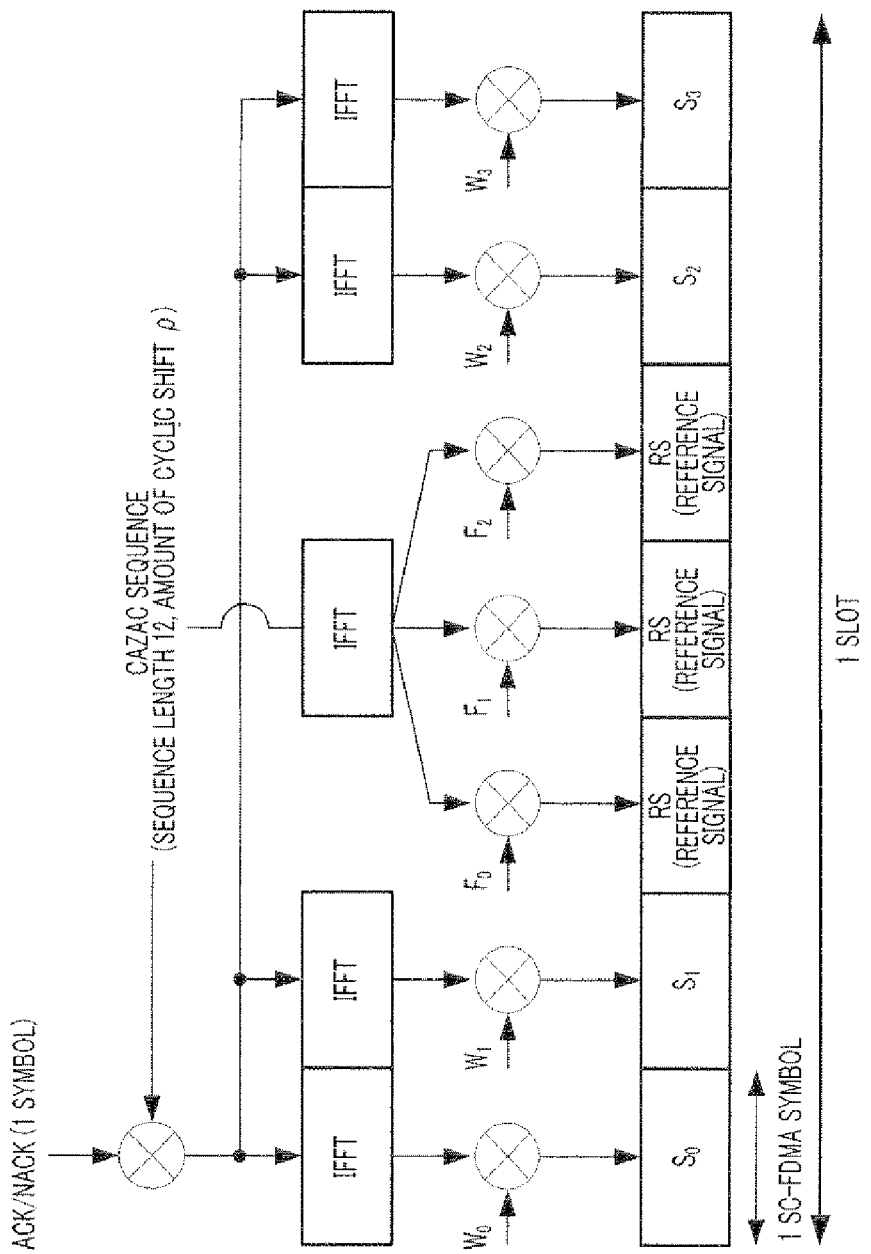
FIG. 1 shows a spreading method of an ACK/NACK signal.
Figure 2A:
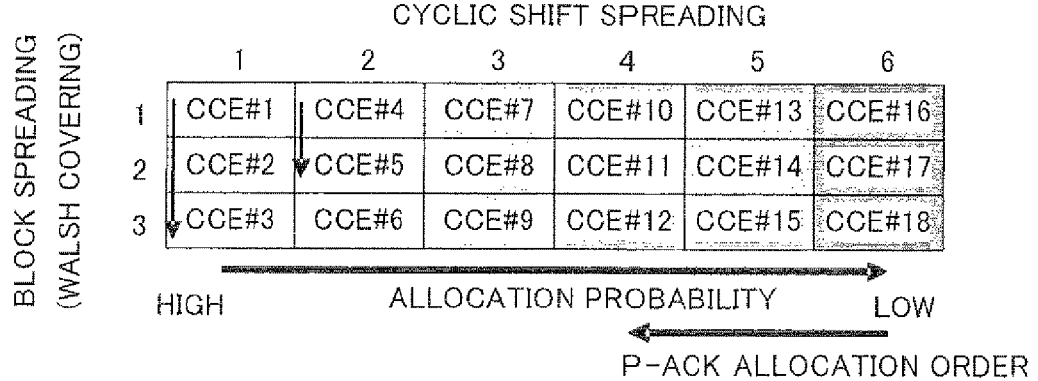
FIG. 2 shows D-ACK and P-ACK resource allocation disclosed in Non-Patent Document 4.
Figure 2B:
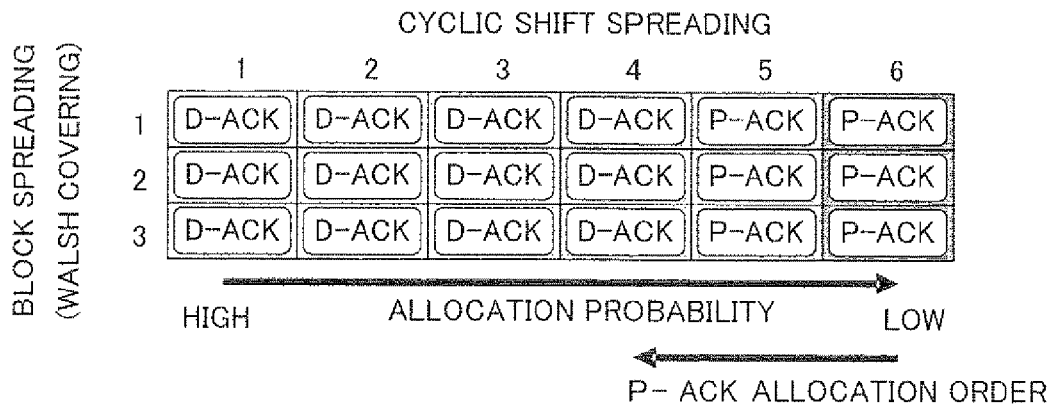
Figure 3:
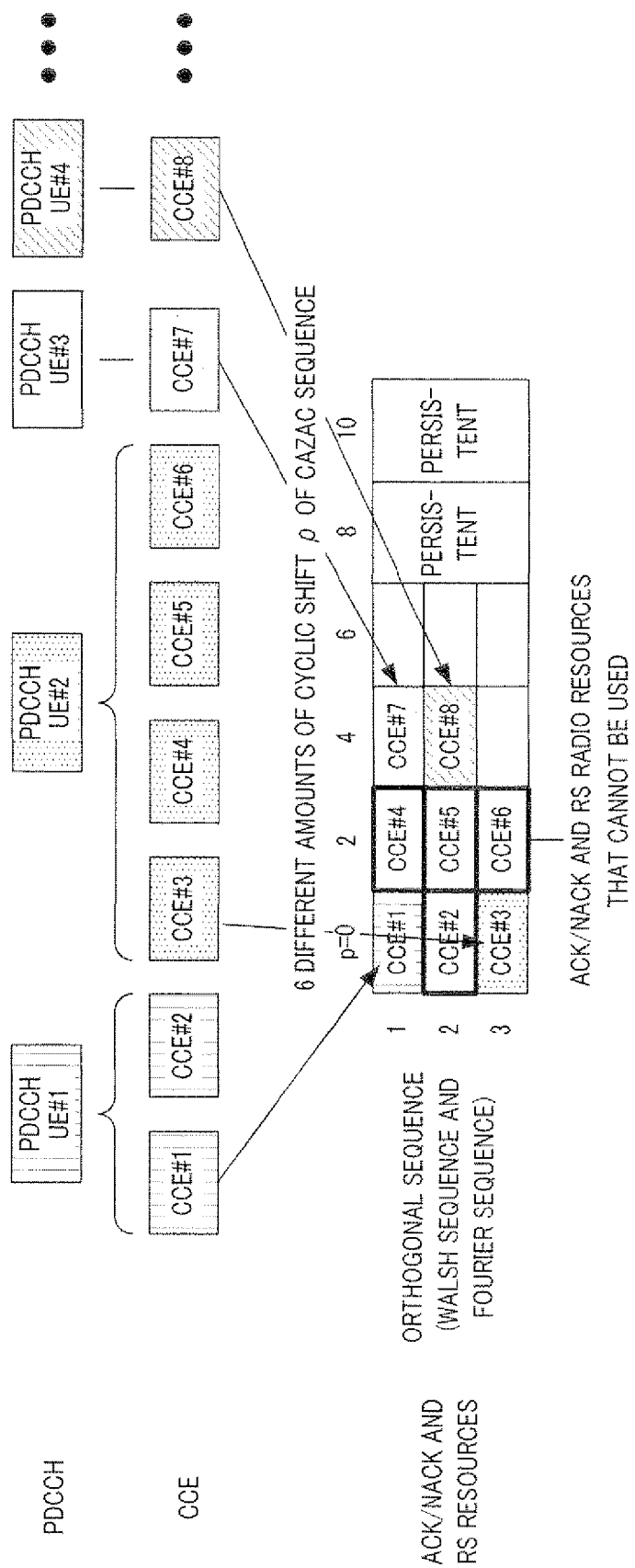
FIG. 3 shows how unoccupied resources are produced.

As shown in FIG. 1, spreading section 215 performs first spreading of the ACK/NACK response signal by the CAZAC sequence set in control section 209 or P-ACK resource control section 213, and outputs the ACK/NACK response signal subjected to first spreading to IFFT section 216.

As shown in FIG. 1, IFFT section 216 performs an IFFT of the ACK/NACK response signal after the first spreading, and outputs the ACK/NACK response signal after IFFT to CP attaching section 217.

CP attaching section 217 attaches the same signal as the tail end part of the ACK/NACK response signal after IFFT, to the head of the ACK/NACK response signal as a CP.

As shown in FIG. 1, spreading section 218 performs second spreading of the ACK/NACK response signal with a CP by the Walsh sequence set in control section 209 or P-ACK resource control section 213, and outputs the ACK/NACK response signal subjected to second spreading to radio transmitting section 219.

When the received data signal carries PDCCH, that is, when the received data is subject to dynamic scheduling, spreading sections 215 and 218 set the cyclic shift CAZAC sequence and the Walsh sequence to use upon PUCCH transmission in control section 209. Further, when the received data signal does not carry PDCCH, that is, when the received data is subject to persistent scheduling, spreading sections 215 and 218 set the cyclic shift CAZAC sequence and the Walsh sequence to use upon PUCCH transmission in P-ACK resource control section 213.

Radio transmitting section 219 performs transmission processing such as D/A conversion, amplification and up-conversion on the ACK/NACK response signal subjected to second spreading, and transmits the resulting signal from antenna 201 to base station 100 (in FIG. 4).

Next, the operations in PUCCH resource control section 104 in base station 100 will be explained in detail.

When a plurality of CCEs are allocated to one mobile station, if the mobile station transmits a ACK/NACK response signal using only the PUCCH associated with the CCE of the smallest number among a plurality of CCEs, PUCCHs associated with CCEs other than the CCE of the smallest number are not used in a plurality of CCEs. That is, when a plurality of CCEs are allocated for one mobile station, response signal physical resources that are not used (unoccupied physical resources) are produced.

Figure 6:
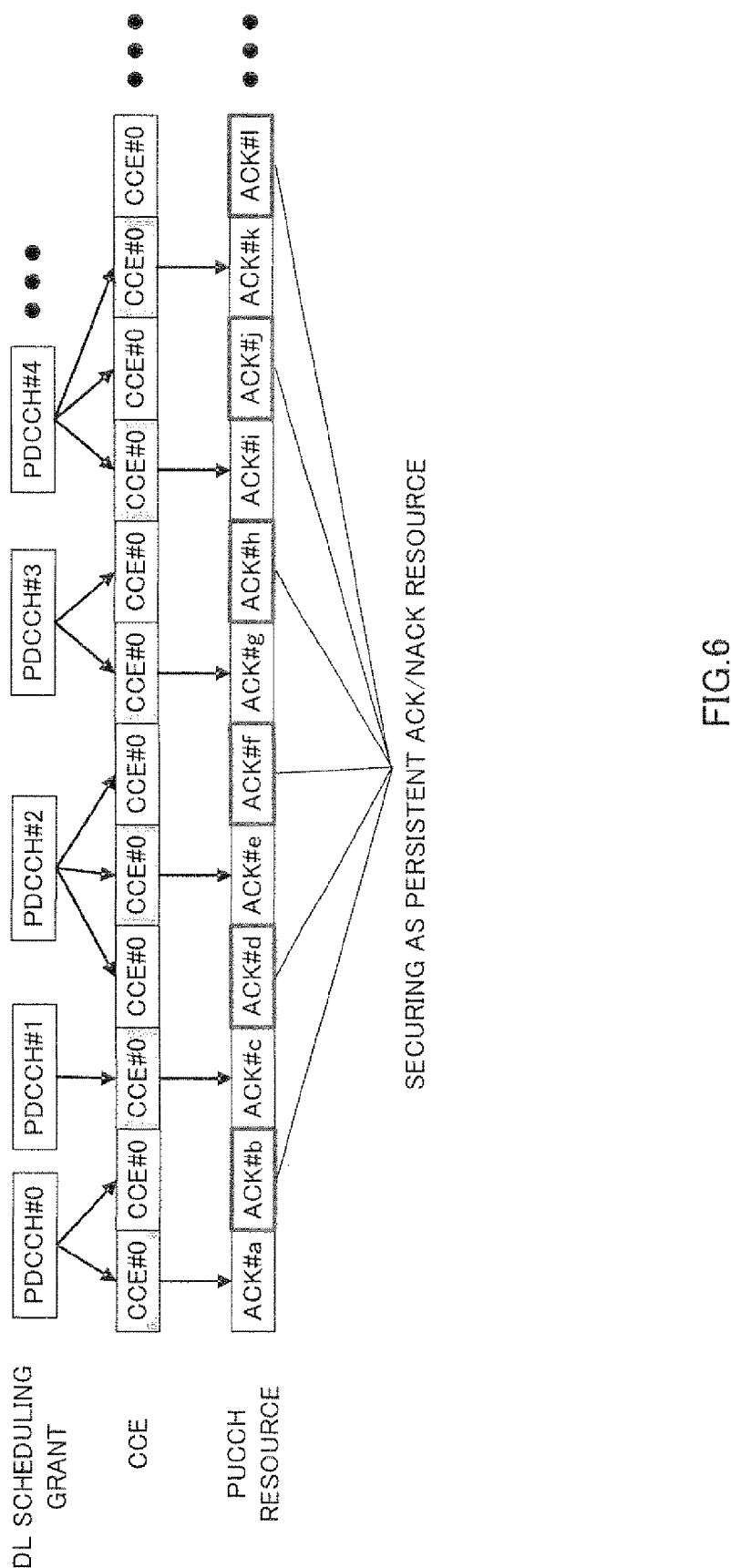
FIG. 6 shows D-ACK and P-ACK resource allocation.

Then, with the present embodiment, when a plurality of CCEs are allocated for one mobile station, unoccupied physical resources produced as described above are used for resources for allocating for P-ACKs as shown in FIG. 6.

To be more specific, in a case where dynamic scheduling is performed, when a plurality of CCEs are allocated upon PDCCH transmission, among a plurality of CCE numbers that can be used, a PUCCH resource associated with an odd CCE number is selected for D-ACK transmission. Meanwhile, P-ACKs for mobile stations subject to persistent scheduling are allocated to a PUCCH resource associated with an even CCE number.

When the number of CCEs used for PDCCH transmission is one, the PUCCH resource associated with that CCE is selected.

Figure 7:
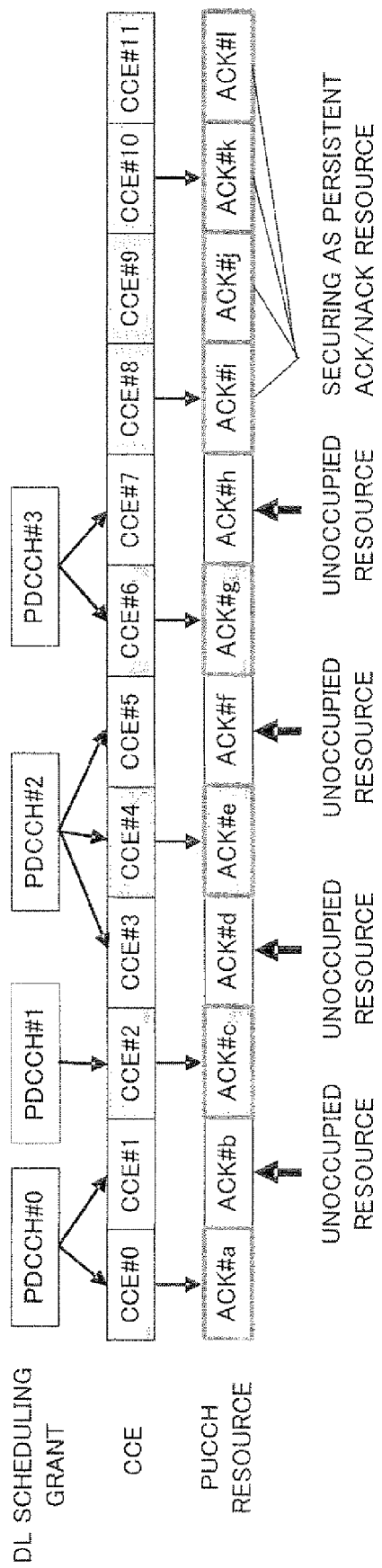
FIG. 7 shows conventional PUCCH resource allocation and the allocation situation.
Figure 8:
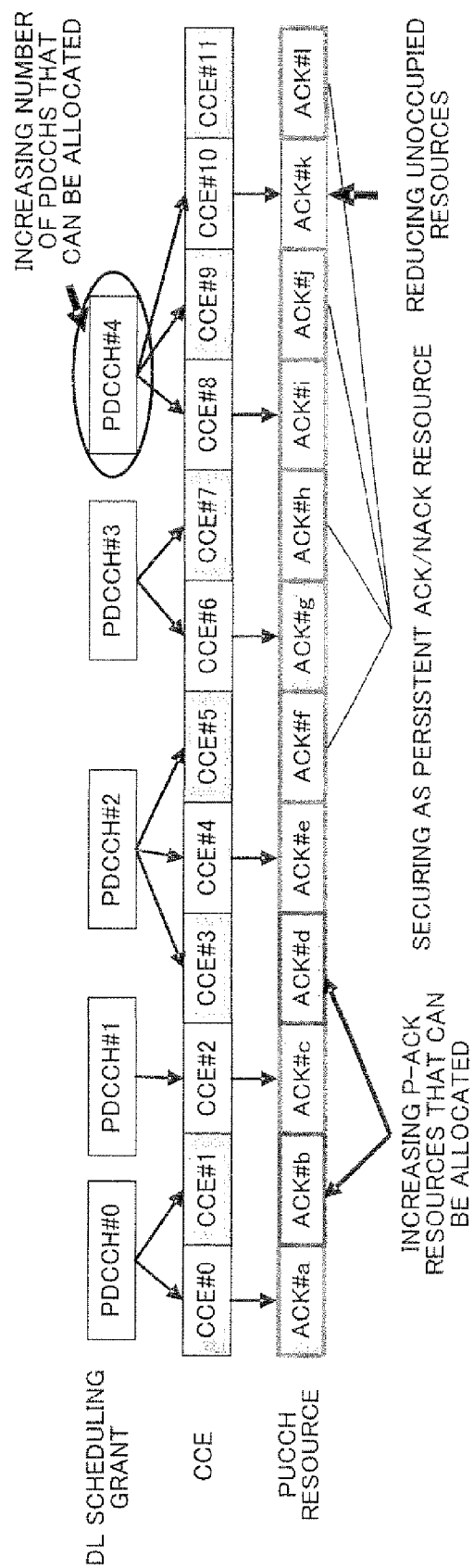
FIG. 8 shows conventional PUCCH resource allocation and the allocation situation.

In cases where the number of CCEs that can be used in PUCCHs is twelve, FIG. 7 shows a conventional PUCCH resource allocation and the allocation situation, and FIG. 8 shows the PUCCH resource allocation and the allocation situation in the present embodiment.

With a conventional PUCCH resource allocation method, CCE #8 to #11 are secured as P-ACK resources in advance, and the rest of CCEs #0 to #7 is used as D-ACK resources. Accordingly, when a plurality of CCEs are used upon PDCCH transmission, unoccupied resources are produced and the efficiency of the use of PUCCH decreases. Further, the number of PDCCHs that can be transmitted is limited to four.

By contrast with this, with the PUCCH resource allocation method of the present invention, odd-numbered CCEs (CCEs #5, #7, #9 and #11) are secured in advance as P-ACK resources. The rest of the CCEs are used as D-ACK resources, and, when a plurality of CCEs are used upon PDCCH transmission, the even-numbered CCEs are selected. In this case, it is equally possible to add CCEs #1 and #3 as P-ACK resources, and it is obvious that the number of PDCCHs that can be transmitted increases by one.

When the number of CCEs that can be transmitted is equal to or more than three, there may be a plurality of even CCE numbers for D-ACKs, and, in this case, even CCE numbers to select may be determined in advance between a base station and mobile stations. For example, the smallest or the greatest even CCE number may be selected. Further, the CCE determination method described in the present embodiment may be utilized recursively. That is, it is possible to determine in advance whether odd-numbered CCEs or even-numbered CCEs are used for CCE numbers that can be also used.

Further, whether the CCE numbers allocated to D-ACKs are odd numbers or even numbers may be determined in the system in advance or reported from a base station to mobile stations.

Further, FIGS. 9 and 10 show comparisons of PUCCH resource allocations and allocation situations between a conventional method and the present embodiment where the mapping example of CCEs and PUCCH resources in Non-Patent Document 4 is used. FIG. 9A shows mapping pattern A, FIG. 9B shows the situation of PUCCH resource allocation using a conventional method in mapping pattern A, and FIG. 9C shows the situation of PUCCH resource allocation in mapping pattern A with the present embodiment. FIG. 10A shows mapping pattern B, FIG. 10B shows the situation of PUCCH resource allocation using a conventional method in mapping pattern B, and FIG. 10C shows the situation of PUCCH resource allocation in mapping pattern B with the present embodiment.

Next, the operations of control section 209 and P-ACK resource control section 213 in mobile station 200 will be explained.

First, when a PDSCH, which mobile station 200 receives in downlink, is subject to dynamic scheduling, as described before, a PDCCH accompanies a received PDSCH, and therefore D-ACK resource information to transmit an ACK/NACK response signal associated with this PDSCH is determined based on CCE numbers to which a PDCCH is allocated.

To be more specific, when a plurality of CCEs are allocated upon PDCCH transmission in the case where dynamic scheduling is performed, in control section 209, the PUCCH resources corresponding to the odd CCE numbers are selected to transmit D-ACKs among a plurality of CCE numbers that can be used.

Whether the CCE numbers allocated to D-ACKs are odd numbers or even numbers are determined by the system in advance, and otherwise, a base station reports the CCE numbers to a mobile station in advance.

When the number of CCEs used to transmit a PDCCH is one, a PUCCH resource corresponding to that CCE is selected.

For example, in the case where the number of CCEs that can be used in a PUCCH is twelve as shown in FIG. 8, when a PDCCH directed to a mobile station is PDCCH #0, the allocated CCE numbers are CCE #0 and CCE #1, and therefore even number CCE #0 is selected and determined. Further, when a PDCCH directed to a mobile station is PDCCH #1, the allocated CCE number is only CCE #2, and therefore a PUCCH resource corresponding to CCE #2 is selected for ACK/NACK. Furthermore, when a PDCCH directed to a mobile station is PDCCH #4, the allocated CCE numbers are CCEs #8, #9 and #10, and therefore CCEs #8 and #10 are applicable to odd-numbered CCEs. When the number of CCEs that can be used is equal to or more than three in this way, a plurality of even CCE numbers as D-ACKs may be present, and, in this case, even CCE numbers to be selected are determined between a base station and mobile stations in advance. For example, the smallest or the greatest even CCE number may be selected. Further, the CCE determination method described in the present embodiment may be utilized recursively. That is, it is possible to determine in advance whether to use an even-numbered CCE or an odd-numbered CCE for CCE numbers that can also be used.

When a PDSCH received at a mobile station in downlink is subject to persistent scheduling, P-ACK resource information for transmitting an ACK/NACK response signal associated with a PDSCH is reported to the mobile station from the base station in advance, so that, based on this P-ACK resource allocation information reported in advance from the base station, P-ACK resource control section 213 in the mobile station designates the CAZAC sequence corresponding to the allocated amount of cyclic shift and the Walsh sequence to spreading sections 215 and 218, to spread and transmit an ACK/NACK response signal.

In this way, according to the present embodiment, when a plurality of CCEs are allocated upon PDCCH transmission, among a plurality of CCE numbers that can be used, by allocating a PUCCH resource corresponding to an odd CCE number for D-ACKs and allocating a PUCCH resource corresponding to an even CCE number for P-ACKs, it is possible to cancel unoccupied resources and improve the efficiency of the use of PUCCH resources.

Although a case has been explained with the present embodiment where, among a plurality of CCE numbers that can be used, the PUCCH resources corresponding to the odd CCE numbers are allocated for D-ACKs and the PUCCH resources corresponding to the even CCE numbers are allocated for P-ACKs, the present invention is not limited to this, and the PUCCH resources corresponding the odd CCE numbers are allocated for P-ACKs and the PUCCH resources corresponding to the even CCE numbers may be allocated for D-ACKs.

Further, with the present embodiment, when other control information including scheduling requests and CQIs in addition to P-ACKs, or, instead of P-ACKs, is multiplexed, scheduling requests and CQI resource information may only be reported from PUCCH resource control section 104. In this case, PUCCH resources for scheduling requests and CQIs are allocated and reported with the same method as with P-ACKs.

Although a case has been explained with the present embodiment where, among a plurality of CCE numbers that can be used, the PUCCH resources corresponding to the odd CCE numbers are allocated for D-ACKs and the PUCCH resources corresponding to the even CCE numbers are allocated for P-ACKs, a CCE number may be selected corresponding to either predetermined value in the $R_N$ obtained from the next equation 1 among a plurality of CCE numbers that can be used, and an ACK/NACK response signal, a band allocation request signal (i.e. SR: Scheduling request) or a CQI may be allocated to the rest of $R_N$.

$$R_N = (CCE \text{ numbers that can be used}) \bmod N \text{ (where } N \text{ is a positive integer)} \quad \text{(Equation 1)}$$

For example, when N=4, control information is allocated so that a P-ACK is allocated to $R_N=0$, a D-ACK is allocated to $R_N=1$, a CQI is allocated to $R_N=2$ and a scheduling request is allocated to $R_N=3$.

By this means, when there are many cases where a plurality of CCEs are allocated, it is possible to allocate N kinds of different resources. Further, it is possible to secure and allocate resources according to a rate of each uplink control channel.

In this case, the same kind of resources are allocated to a plurality of $R_N$'s. For example, a D-ACK is allocated to $R_N=0$, a P-ACK is allocated to $R_N=1$ and $R_N=2$, a CQI is allocated to $R_N=3$, and so on.

Incidentally, the resource allocation by separating the odd CCE numbers from the even CCE numbers with the above present embodiment corresponds to N=2 in above equation 1.

The above present embodiment may be applicable to part of all PUCCH resources. That is, the present invention may be provided for part of resources of a PUCCH that uses different times, frequencies and code space.

Although, the same code resources as PUCCH resources have been explained with the present embodiment regardless of a cyclic shift sequence and a Walsh sequence (DFT sequence), when a plurality of CCEs are allocated, CCE numbers that can be used as D-ACK resources may be made different between Walsh sequences. That is, when a PDCCH is allocated to CCE #0 to CCE #5 that are allocated to Walsh sequence 1, the PUCCH resources corresponding to the even-numbered CCEs are applied as D-ACK resources, and the PUCCH resources corresponding to the odd-numbered CCEs are applied as P-ACK resources. Meanwhile, when a PDCCH is allocated to CCE #6 to CCE #11 that are allocated to Walsh sequence 2, the PUCCH resources corresponding to the odd-numbered CCEs are applied as D-ACK resources, and the PUCCH resources corresponding to the even-numbered CCEs are applied as P-ACK resources.

Further, although a ease has been explained with the present embodiment as an example where dynamic scheduling ACK/NACK resources and persistent scheduling ACK/NACK resources are allocated in a PDSCH (downlink data channel), the present invention is not limited to this, and may be applicable to allocation of dynamic scheduling ACK/NACK resources and persistent scheduling ACK/NACK resources in a PUSCH (uplink data channel).

To be more specific, in a system in which dynamic scheduling ACK/NACK resources are associated with CCE numbers allocated upon transmission of a downlink control channel (PDCCH) including scheduling information of a PUSCH and ACK/NACK resources transmitted from the base station, when one or more CCEs are allocated for PDCCH transmission, resources to use upon transmission as dynamic scheduling ACK/NACK, resource are even CCE numbers (or odd CCE numbers) ACK/NACK resources corresponding to odd CCE numbers (or even CCE numbers) are allocated as control information (persistent scheduling ACK/NACK resources, CQIs, scheduling requests and so on) required to be allocated and reported to mobile stations in advance. Further, the mobile stations follow this rule, determine the dynamic scheduling ACK/NACK resources reported from the base station and receives an ACK/NACK directed to the mobile stations.

A case where ACK/NACK resources are allocated to a PUSCH subject to dynamic scheduling differs from a case where ACK/NACK resources are allocated to a PDSCH in: determining allocation using a CCE number of a PDCCH including PUSCH scheduling information; in the base station, receiving PUSCHs transmitted from mobile stations, generating ACK/NACK signals on a per PUSCH basis and transmitting ACK/NACK resources to the mobile stations; and, transmitting PUSCHs to the base station from the mobile stations and receiving ACK/NACKs directed to the mobile stations. For the rest of points, as described in the above-described embodiment, both the base station and the mobile stations determine dynamic scheduling ACK/NACK resources from the CCE numbers of PDCCH reported from the base station, based on dynamic scheduling ACK/NACK resource allocation rules.

Further, although a case has been explained with the present embodiment as an example where a downlink ACK/NACK response signal is transmitted in uplink corresponding to CCEs in which downlink control information (PDCCH) is transmitted, the present invention is applicable to all radio resource reporting methods that use the method of determining radio resources for uplink transmission data or downlink transmission data corresponding to downlink transmission signal resources, and the present invention is not limited to PDCCHs, CCEs, ACK/NACK response signals for downlink. Consequently, it is possible to define a PDCCH as the first channel, define a CCE as a physical or logical resource allocation unit to use first channel transmission, and define an ACK/NACK response signal as a second channel.

Further, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSIs, and implementation using dedicated circuitry or general purpose processors is also possible. After LSI manufacture, utilization of a programmable FPGA (Field Programmable Gate Array) or a reconfigurable process or where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2007-245929, filed on Sep. 21, 2007, including the specification, drawings and abstract, is incorporated herein by reference in its entirety.

INDUSTRIAL APPLICABILITY

The radio communication base station apparatus, the radio communication terminal apparatus and the response signal allocation method according to the present invention are able to allocate D-ACK and P-ACK resources while maintaining the use efficiency of uplink control channels including PUCCHs, and, are applicable to, for example, mobile communication systems.

The invention claimed is:

1. A radio communication base station apparatus in which, in downlink data transmitted to a radio communication terminal apparatus subject to dynamic scheduling, resources to use to transmit an acknowledgment or negative acknowledgment in uplink from the radio communication terminal apparatus, are associated on a one-by-one basis with indexes of control channel elements allocated to a physical downlink control channel for downlink data transmission, the radio communication base station apparatus comprising:

a resource control section that, when a plurality of control channel elements are allocated to one physical downlink control channel, allocates resources corresponding to one of odd index of control channel element and even index of control channel element out of the plurality of control channel elements for an acknowledgment or negative acknowledgment transmitted from the radio communication terminal apparatus subject to the dynamic scheduling, and allocates resources corresponding to the other one of the odd index of control channel element and the even index of control channel element out of the plurality of control channel elements for an acknowledgment or negative acknowledgment transmitted from a radio communication terminal apparatus subject to persistent scheduling; and a reporting section that reports the allocated resources to each radio communication terminal apparatus to which resources are allocated.

2. The radio communication base station apparatus according to claim 1, wherein, when the plurality of control channel elements are allocated to one physical downlink control channel, the resource control section allocates resource associated in advance with a value of a remainder obtained by dividing each of the plurality of control channel elements by a positive integer N.

3. A radio communication terminal apparatus in which, in uplink data subject to dynamic scheduling, resources to use to transmit an acknowledgment or negative acknowledgment in downlink from a radio communication base station apparatus are associated on a one-by-one basis with indexes of control channel elements allocated to a physical downlink control channel including scheduling information of physical uplink shared channel, the radio communication terminal apparatus comprising:

a resource control section that, when a plurality of control channel elements are allocated to one physical downlink control channel, allocates resources corresponding to one of odd index of control channel element and even index of control channel element for an acknowledgment or negative acknowledgment in a case where the resource is subject to the dynamic scheduling, and allocates resource corresponding to the other one of the odd index of control channel element and the even index of control channel element out of the plurality of control channel elements for an acknowledgment or negative acknowledgment in the case where the resource is subject to persistent scheduling; and a reporting section that reports the allocated resources to the radio communication base station apparatus to which resources are allocated.

4. A response signal allocation method performed by a base station apparatus, the method comprising:

associating on a one-by-one basis resources to use to transmit an acknowledgment or negative acknowledgment from a radio communication terminal apparatus with indexes of control channel elements allocated to a physical downlink control channel for downlink data transmission; and when a plurality of control channel elements are allocated to one physical downlink control channel, allocating resource corresponding to one of odd index of control channel element and even index of control channel element out of the plurality of control channel elements for an acknowledgment or negative acknowledgment transmitted from a radio communication terminal apparatus subject to dynamic scheduling, and allocating resources corresponding to the other one of the odd index of control channel element and the even index of control channel element out of the plurality of control channel elements for an acknowledgment or negative acknowledgment transmitted from a radio communication terminal apparatus subject to persistent scheduling.

* * * * *